(12) United States Patent
Yang et al.

(10) Patent No.: US 11,363,583 B2
(45) Date of Patent: Jun. 14, 2022

(54) METHOD AND APPARATUS FOR UPLINK COMMUNICATION BASED ON GRANT-FREE SCHEME IN COMMUNICATION SYSTEM

(71) Applicant: ELECTRONICS AND TELECOMMUNICATIONS RESEARCH INSTITUTE, Daejeon (KR)

(72) Inventors: Mi Jeong Yang, Daejeon (KR); Sung Min Oh, Daejeon (KR); Soon Yong Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 111 days.

(21) Appl. No.: 16/727,208

(22) Filed: Dec. 26, 2019

(65) Prior Publication Data

US 2020/0252914 A1 Aug. 6, 2020

(30) Foreign Application Priority Data

Feb. 1, 2019 (KR) .................. 10-2019-0013796

(51) Int. Cl.
*H04W 72/04* (2009.01)
*H04W 76/27* (2018.01)

(52) U.S. Cl.
CPC ......... *H04W 72/042* (2013.01); *H04W 76/27* (2018.02)

(58) Field of Classification Search
CPC .... H04W 72/04; H04W 76/27; H04W 72/042
See application file for complete search history.

(56) References Cited

U.S. PATENT DOCUMENTS

| | | | |
|---|---|---|---|
| 10,178,657 B2 | 1/2019 | Tseng et al. | |
| 10,187,878 B2 | 1/2019 | Lin et al. | |
| 2016/0309471 A1* | 10/2016 | Lee .................. | H04L 5/0048 |
| 2018/0152938 A1* | 5/2018 | Miao ................. | H04L 1/1671 |
| 2018/0279327 A1 | 9/2018 | Ying et al. | |
| 2018/0332541 A1* | 11/2018 | Liu .................... | H04W 52/241 |
| 2019/0007176 A1 | 1/2019 | Ozturk et al. | |
| 2019/0014563 A1* | 1/2019 | Lee .................. | H04L 5/0053 |
| 2019/0053218 A1 | 2/2019 | Kim et al. | |
| 2019/0075589 A1 | 3/2019 | Jeon et al. | |
| 2019/0342911 A1* | 11/2019 | Talarico .............. | H04W 76/27 |
| 2020/0107356 A1* | 4/2020 | Rico Alvarino ..... | H04L 1/1864 |

(Continued)

FOREIGN PATENT DOCUMENTS

| | | |
|---|---|---|
| WO | 2018/128401 A1 | 7/2018 |
| WO | 2018/174639 A1 | 9/2018 |

*Primary Examiner* — Chi Ho A Lee
(74) *Attorney, Agent, or Firm* — LRK Patent Law Firm

(57) ABSTRACT

A method and an apparatus for uplink communication based on grant-free scheme in a communication system. An operation method of a terminal includes receiving an RRC message from a base station, the RRC message including information indicating a frequency resource of a PUSCH; receiving a DCI from the base station, the DCI including information indicating a time resource of the PUSCH; and transmitting the PUSCH to the base station using the time-frequency resource indicated by the RRC message and the DCI. Therefore, the performance of the communication system can be improved.

17 Claims, 7 Drawing Sheets

(56) References Cited

U.S. PATENT DOCUMENTS

| | | | |
|---|---|---|---|
| 2020/0120642 A1* | 4/2020 | Hwang | H04L 5/005 |
| 2020/0205029 A1* | 6/2020 | Lee | H04W 28/0278 |
| 2020/0221492 A1* | 7/2020 | Lu | H04W 74/004 |
| 2020/0229242 A1* | 7/2020 | Xiong | H04W 74/008 |
| 2021/0014881 A1* | 1/2021 | Aiba | H04L 5/0057 |
| 2021/0028911 A1* | 1/2021 | Yeo | H04L 1/1887 |
| 2021/0051634 A1* | 2/2021 | Fakoorian | H04W 72/0413 |
| 2021/0068115 A1* | 3/2021 | Gotoh | H04L 5/0055 |
| 2021/0160904 A1* | 5/2021 | Shi | H04W 72/1268 |
| 2021/0160917 A1* | 5/2021 | Goto | H04W 72/12 |

* cited by examiner

METHOD AND APPARATUS FOR UPLINK COMMUNICATION BASED ON GRANT-FREE SCHEME IN COMMUNICATION SYSTEM

CROSS-REFERENCE TO RELATED APPLICATION

This application claims priority to Korean Patent Application No. 10-2019-0013796 filed on Feb. 1, 2019 with the Korean Intellectual Property Office (KIPO), the entire content of which is hereby incorporated by reference.

BACKGROUND

1. Technical Field

The present disclosure relates generally to an uplink communication technique, and more specifically, to an uplink communication technique based on grant-free scheme for satisfying low-latency service requirements.

2. Description of Related Art

With the development of information and communication technology, various wireless communication technologies are being developed. Typical wireless communication technologies include long term evolution (LTE), new radio (NR), etc. defined in the 3rd generation partnership project (3GPP) standard. The LTE may be one of the fourth generation (4G) wireless communication technologies, and the NR may be one of the fifth generation (5G) wireless communication technologies.

The 5G communication system (e.g., communication system supporting the NR) using a frequency band (e.g., frequency band above 6 GHz) higher than a frequency band (e.g., frequency band below 6 GHz) of the 4G communication system as well as the frequency band of the 4G communication system is being considered for processing of wireless data which has rapidly increased since the commercialization of the 4G communication system. The 5G communication system can support Enhanced Mobile Broadband (eMBB), Ultra-Reliable and Low-Latency Communication (URLLC), and massive Machine Type Communication (mMTC).

The NR may be applied to communication systems for factory automation. The communication system for factory automation may include a control apparatus, a sensor, and an actuator. The sensor and the actuator may be implemented as one device. The control apparatus may correspond to a base station, and the device (e.g., sensor or actuator) may correspond to a terminal. The control apparatus may transmit a packet including a control command to the actuator. The actuator may receive the packet including the control command from the control apparatus, and may operate based on the control command. The sensor may be installed in the vicinity of the actuator. The sensor located near the actuator may sense an operation of the corresponding actuator (or a result according to the operation of the actuator) and transmit a packet including the sensed result to the control apparatus. The control apparatus may receive the sensed result from the sensor. That is, the communication system for factory automation may be operated based on a closed-loop control scheme.

In the communication system for factory automation, the length of the packet transmitted and received between nodes (e.g., control apparatus, sensor, and actuator) may be relatively short. In addition, the packet may occur periodically, and a generation periodicity of the packet may be relatively short. In the communication system for factory automation, the requirement of block error rate (BLER) may be $10^{-9}$ or less, and the requirement of end-to-end latency may be 1 millisecond or less. That is, for error-free operation of machines, communications between the control apparatus, sensor, and actuator involved in the operation of the machine should meet the requirements of reliability and latency. Therefore, communication technologies are required to meet the requirements of reliability and latency while maintaining the efficiency of use of radio resources in the communication system for factory automation.

SUMMARY

Accordingly, exemplary embodiments of the present disclosure provide a method and an apparatus for uplink communication based on grant-free scheme in a communication system.

According to an exemplary embodiment of the present disclosure, an operation method of a terminal supporting uplink communication in a communication system may comprise receiving a radio resource control (RRC) message from a base station, the RRC message including information indicating a frequency resource of a physical uplink shared channel (PUSCH); receiving downlink control information (DCI) from the base station, the DCI including information indicating a time resource of the PUSCH; and transmitting the PUSCH to the base station using the time-frequency resource indicated by the RRC message and the DCI.

The RRC message may include a table indicating candidate time resources for the PUSCH, and the information indicating the time resource of the PUSCH included in the DCI may indicate one candidate time resource among the candidate time resources.

The table may include an offset, a starting symbol, and a length of each of the candidate time resources.

The RRC message may further include information indicating a periodicity of the time resource, wherein the time resource used for transmission of the PUSCH is determined according to the periodicity indicated by the RRC message.

The DCI may further include information indicating a reconfigured periodicity, wherein the time resource used for transmission of the PUSCH is determined according to the reconfigured periodicity indicated by the DCI.

The DCI may further include an indicator requesting activation of the frequency resource configured by the RRC message.

According to another exemplary embodiment of the present disclosure, an operation method of a base station supporting uplink communication in a communication system may comprise transmitting a radio resource control (RRC) message to a terminal, the RRC message including information indicating a frequency resource of a physical uplink shared channel (PUSCH); transmitting downlink control information (DCI) to the terminal, the DCI including information indicating a time resource of the PUSCH; and receiving the PUSCH from the terminal through the time-frequency resource indicated by the RRC message and the DCI.

The RRC message may include a table indicating candidate time resources for the PUSCH, and the information indicating the time resource of the PUSCH included in the DCI may indicate one candidate time resource among the candidate time resources.

The table may include an offset, a starting symbol, and a length of each of the candidate time resources.

The RRC message may further include information indicating a periodicity of the time resource, wherein the time resource used for transmission of the PUSCH is determined according to the periodicity indicated by the RRC message.

The DCI may further include information indicating a reconfigured periodicity, wherein the time resource used for transmission of the PUSCH is determined according to the reconfigured periodicity indicated by the DCI.

The DCI may further include an indicator requesting activation of the frequency resource configured by the RRC message.

According to yet another exemplary embodiment of the present disclosure, an operation method of a terminal supporting uplink communication in a communication system may comprise receiving, from a base station, a radio resource control (RRC) message including a first grant for first data; receiving, from the base station, downlink control information (DCI) including a second grant for second data; and when a first time-frequency resource indicated by the first grant overlaps a second time-frequency resource indicated by the second grant, transmitting the first data to the base station by using the first time-frequency resource, and transmitting the second data to the base station by using a resource excluding the first time-frequency resource among the second time-frequency resource.

The operation method may further comprise transmitting a scheduling request (SR) for requesting resource allocation for the second data to the base station when the second data is generated, wherein the DCI including the second grant is received in response to the SR.

The first data may be transmitted based on a rate matching scheme or a puncturing scheme.

The transmission priority of the first data may be higher than the transmission priority of the second data.

The first time-frequency resource indicated by the first grant may be configured according to a preconfigured periodicity.

According to the exemplary embodiments of the present disclosure, in the quasi-configured-grant based uplink communication procedure, a configured-grant (CG) frequency resource may be indicated by a radio resource control (RRC) message, and a CG time resource may be dynamically indicated by downlink control information (DCI). Therefore, resource efficiency in the communication system can be improved. In addition, the periodicity of the CG resource can be dynamically changed by a medium access control (MAC) control element (CE) or a DCI. In this case, since the CG resource periodicity can be changed as the requirements of the communication service are changed, the performance of the communication system can be improved. In addition, since a hybrid automatic repeat request (HARQ) process identifier (ID) of MSG3 can be configured by the base station in a random access procedure, a problem of collision between the HARQ process ID of the MSG3 and a HARQ process ID of a physical uplink shared channel (PUSCH) can be resolved. In addition, in case that Ultra-Reliable and Low-Latency Communication (URLLC) data is generated while a grant PUSCH is being transmitted, a configured-grant PUSCH including the URLLC data may be multiplexed with the grant PUSCH. Therefore, the problem of transmission latency of the URLLC data can be resolved.

BRIEF DESCRIPTION OF DRAWINGS

Exemplary embodiments of the present disclosure will become more apparent by describing in detail embodiments of the present disclosure with reference to the accompanying drawings, in which.

Figure 1:
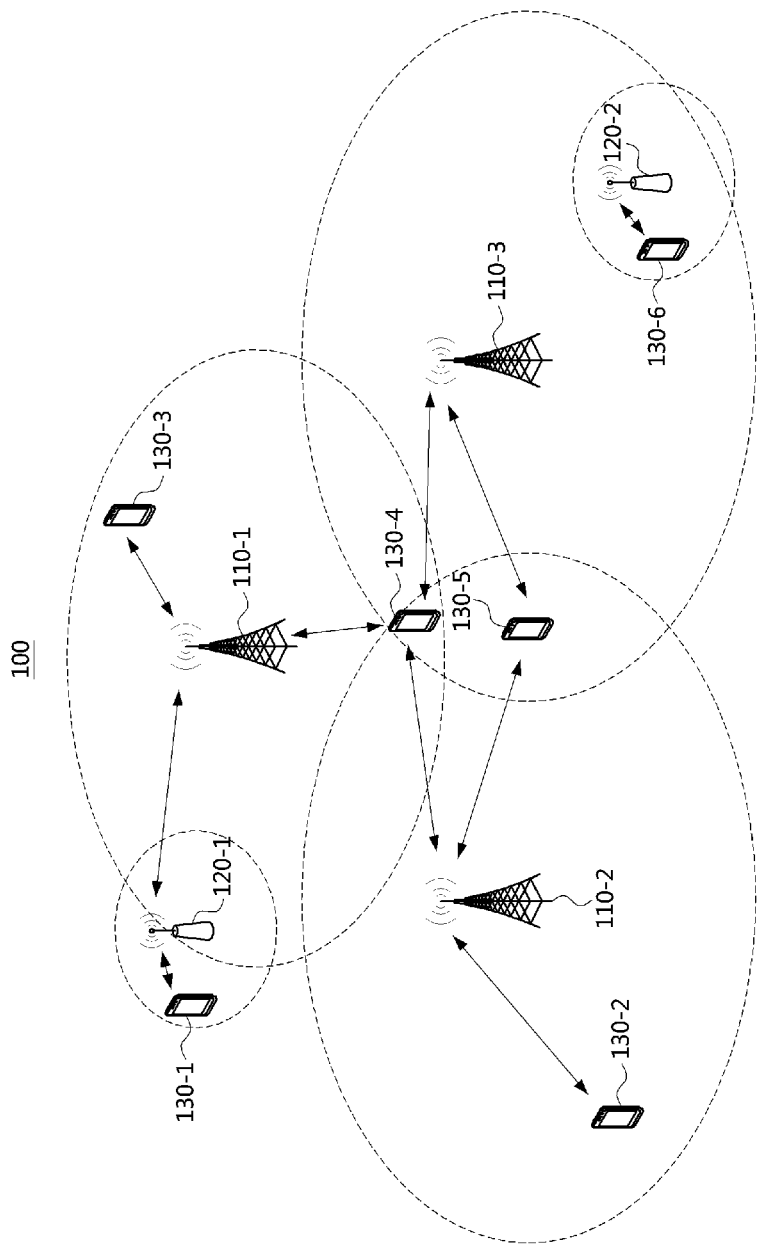
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which embodiments of the present disclosure are applied will be described. The communication system to which the embodiments according to the present disclosure are applied is not limited to the following description, and the embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE), LTE-advanced (LTE-A)), 5G communication (e.g., new radio (NR)), or the like. The 4G communication may be performed in a frequency band below 6 GHz, and the 5G communication may be performed in a frequency band above 6 GHz as well as the frequency band below 6 GHz.

For example, for the 4G communication and the 5G communication, the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like.

Also, the communication system 100 may further comprise a core network. When the communication system supports the 4G communication, the core network may include a serving gateway (S-GW), a packet data network (PDN) gateway (P-GW), a mobility management entity (MME), and the like. When the communication system 100 supports the 5G communication, the core network may include an access and mobility management function (AMF), a user plane function (UPF), a session management function (SMF), and the like.

Meanwhile each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
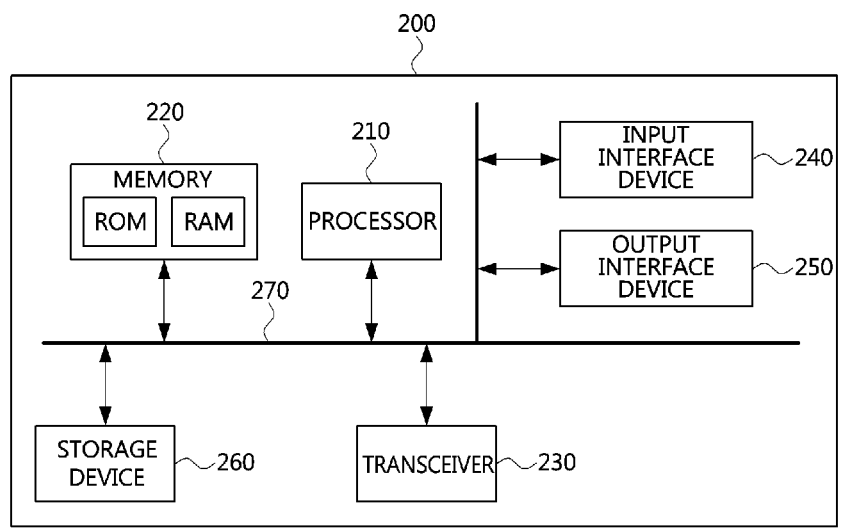
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, uplink communication methods based on grant-free scheme in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

The following exemplary embodiments may be applied to a communication system for factory automation. The communication system for factory automation may include a control apparatus, a sensor, and an actuator. The sensor and the actuator may be implemented as one device. The control apparatus may correspond to a base station in the following exemplary embodiments, and the device (e.g., sensor or actuator) may correspond to a terminal in the following exemplary embodiments.

In the communication system, configured-grant based uplink communication may be performed to satisfy the requirements of Ultra-Reliable and Low-Latency Communication (URLLC).

Figure 3:
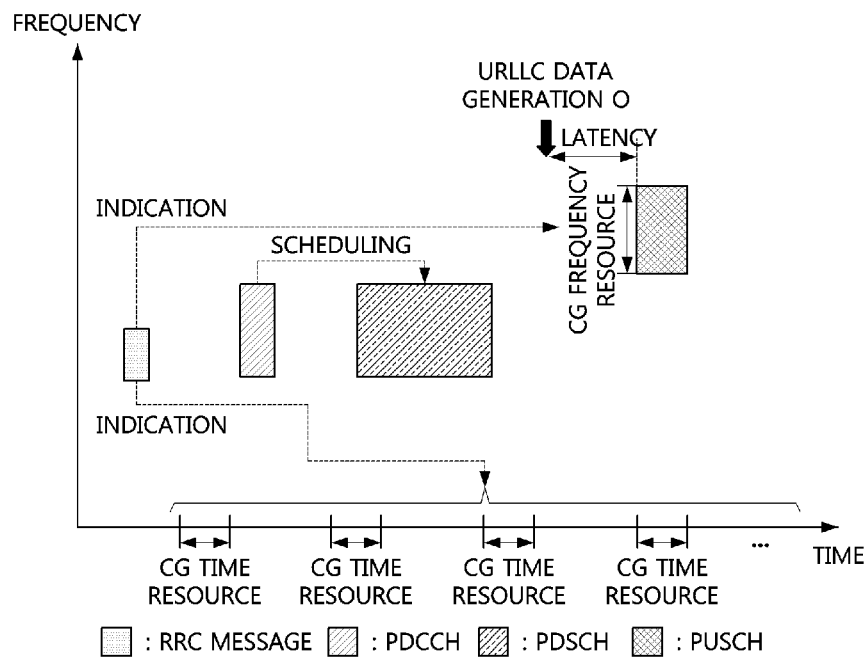
FIG. 3 is a conceptual diagram illustrating a first exemplary embodiment of a configured-grant based uplink communication method in a communication system.

FIG. 3 is a conceptual diagram illustrating a first exemplary embodiment of a configured-grant based uplink communication method in a communication system.

Referring to FIG. 3, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2.

The base station may generate a radio resource control (RRC) message including configured-grant configuration information (i.e., ConfiguredGrantConfig information), and may transmit the generated RRC message. The configured-grant configuration information may include information elements (e.g., timeDomainOffset, timeDomainAllocation, frequencyDomainAllocation) indicating a time-frequency resource (hereinafter referred to as a 'configured-grant (CG) resource') allocated for uplink communication (e.g., a physical uplink shared channel (PUSCH) transmission).

The terminal may receive the RRC message from the base station, may identify the configured-grant configuration information included in the received RRC message, and may identify the CG resource based on the configured-grant configuration information. The CG resource may be configured periodically and may be always allocated regardless of whether uplink data is generated.

Meanwhile, when downlink data to be transmitted to the terminal is generated, the base station may generate downlink control information (DCI) including resource allocation information of a physical downlink shared channel (PDSCH), and transmit the generated DCI through a physical downlink control (PDCCH). The base station may transmit the downlink data to the terminal through a PDSCH scheduled by the DCI.

The terminal may receive the DCI from the base station through the PDCCH, and may identify the PDSCH by identifying information elements included in the received DCI. The terminal may receive the downlink data from the base station through the PDSCH.

On the other hand, when uplink data to be transmitted to the base station is generated, the terminal may transmit the uplink data using the CG resource configured by the RRC message. The uplink data may be URLLC data (e.g., data transmitted while satisfying the URLLC requirements). If there is a difference between the generation time point of the uplink data and the starting time point of the CG resource, the URLLC requirements may not be satisfied. In order to satisfy the URLLC requirements, the allocation periodicity of the CG resource may be configured to be short. For example, the CG resource may be configured for each slot. However, unnecessary resources may be wasted in this case.

Also, since the configured-grant based uplink communication method is a contention-based uplink communication method, when the configured-grant based uplink communication method is applied to the communication system for factory automation, the URLLC requirements may not be satisfied in the communication system. Here, the URLLC requirements in the communication system for factory automation may be stricter than the URLLC requirements in a general communication system.

In order to solve this problem, a quasi-configured-grant based uplink communication method may be performed.

Quasi-Configured-Grant Based Uplink Communication Method

Figure 4:
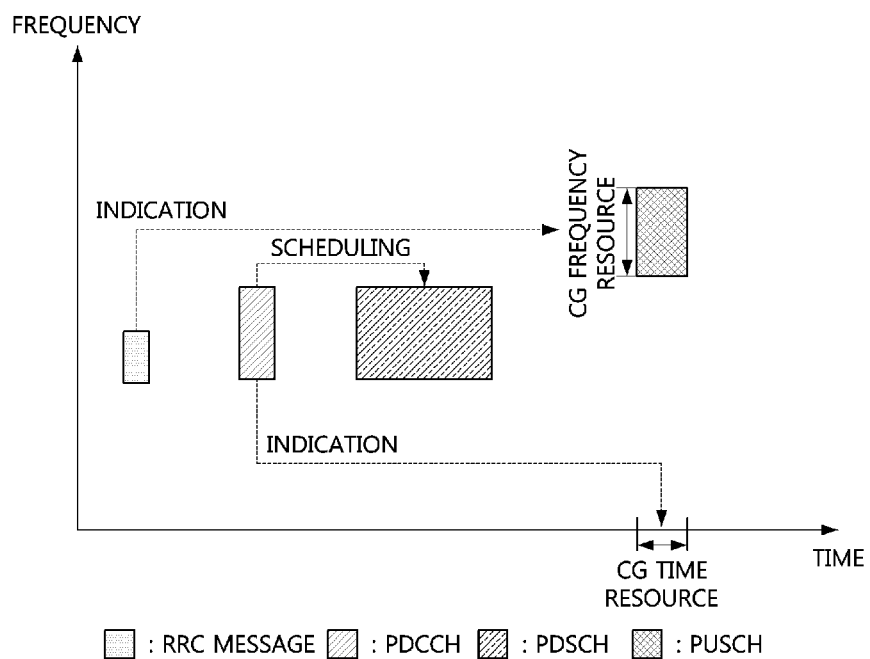
FIG. 4 is a conceptual diagram illustrating a first exemplary embodiment of a quasi-configured-grant based uplink communication method in a communication system.

FIG. 4 is a conceptual diagram illustrating a first exemplary embodiment of a quasi-configured-grant based uplink communication method in a communication system.

Referring to FIG. 4, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2.

The base station may generate an RRC message including configured-grant configuration information and may transmit the generated RRC message. The configured-grant configuration information may include an information element (e.g., frequencyDomainAllocation) indicating a frequency resource (hereinafter referred to as 'CG frequency resource') allocated for uplink communication (e.g., PUSCH transmission). Also, the configured-grant configuration information may include a time table for time resources (hereinafter, referred to as 'CG time resources') allocated for uplink communication (e.g., PUSCH transmission).

The time table may indicate an offset, a starting symbol, and a length of the CG time resource, and may be configured as shown in Table 1 below.

TABLE 1

| Index | Offset | Starting symbol | Length |
|-------|--------|-----------------|--------|
| 00    | xx     | y               | zz     |
| 01    | xx     | y               | zz     |
| 10    | xx     | y               | zz     |
| 11    | xx     | y               | zz     |

The offset may be a value indicated by 'timeDomainOffset' included in the configured-grant configuration information described with reference to FIG. 3. The starting symbol and the length may be values indicated by 'timeDomainAllocation' included in the configured-grant configuration information described with reference to FIG. 3. That is, in the quasi-configured-grant based uplink communication method, the configured-grant configuration information may include the time table instead of 'timeDomainOffset' and 'timeDomainAllocation'.

The terminal may receive the RRC message from the base station, may identify the configured-grant configuration information included in the received RRC message, and may identify the CG frequency resource and the time table based on the configured-grant configuration information.

Meanwhile, when downlink data to be transmitted to the terminal is generated, the base station may generate a DCI including resource allocation information of a PDSCH. Also, the DCI may further include CG resource allocation information, and the CG resource allocation information may indicate one index in the time table configured by the RRC message (e.g., the time table described in Table 1). The size of the field in which the CG resource allocation information is recorded in the DCI may be determined according to the number of indexes included in the time table. If the configured-grant configuration information does not include the time table, the time table may be included in the DCI. In this case, the DCI may further include the time table as well as the CG resource allocation information.

The base station may transmit a DCI including (resource allocation information of PDSCH+CG resource allocation information) or (resource allocation information of PDSCH+time table+CG resource allocation information) through a PDCCH. The base station may transmit the downlink data to the terminal through a PDSCH scheduled by the DCI. Here, the DCI may have a DCI format 1_0 or a DCI format 1_1. The DCI (e.g., a cyclic redundancy check (CRC) value of the DCI) may be scrambled by a cell-radio network temporary identifier (C-RNTI) or an MCS-C-RNTI.

The terminal may receive the DCI from the base station through the PDCCH, and may identify the PDSCH by identify the information elements included in the received DCI. The terminal may receive the downlink data from the base station through the PDSCH. Also, the terminal may obtain the CG resource allocation information from the DCI, and may identify the offset, starting symbol, and length mapped to the CG resource allocation information (e.g., index) in the time table obtained from the RRC message. The terminal may identify the CG time resource based on the offset, starting symbol, and length. That is, the terminal may identify a time-frequency resource (i.e., CG resource) for PUSCH transmission based on the CG frequency resource indicated by the configured-grant configuration information and the CG time resource indicated by the configured-grant configuration information and the DCI.

When uplink data (e.g., URLLC data) is generated in the terminal, the terminal may transmit the uplink data by using the CG resource indicated by the RRC message and the DCI.

Method for Changing Periodicity of CG Resource in Quasi-Configured-Grant-Based Uplink Communication

The configured-grant configuration information transmitted through the RRC message may include a periodicity parameter, and the periodicity parameter may be configured according to a subcarrier spacing as shown in Table 2 below. In Table 2, the unit of periodicity may be a symbol.

TABLE 2

| Subcarrier spacing | Periodicity |
|---|---|
| 15 kHz | 2, 7, n*14 |
| | Here, n = {1, 2, 4, 5, 8, 10, 16, 20, 32, 40, 64, 80, 128, 160, 320, 640} |
| 30 kHz | 2, 7, n*14 |
| | Here, n = {1, 2, 4, 5, 8, 10, 16, 20, 32, 40, 64, 80, 128, 160, 256, 320, 640, 1280} |
| 60 kHz (normal CP) | 2, 7, n*14 |
| | Here, n = {1, 2, 4, 5, 8, 10, 16, 20, 32, 40, 64, 80, 128, 160, 256, 320, 512, 640, 1280, 2560} |
| 60 kHz (extended CP) | 2, 7, n*12 |
| | Here, n = {1, 2, 4, 5, 8, 10, 16, 20, 32, 40, 64, 80, 128, 160, 256, 320, 512, 640, 1280, 2560} |
| 120 kHz | 2, 7, n*14 |
| | Here, n = {1, 2, 4, 5, 8, 10, 16, 20, 32, 40, 64, 80, 128, 160, 256, 320, 512, 640, 1024, 1280, 2560, 5120} |

In the communication system, the CG resource may be configured and activated in units of a serving cell. If a change in the periodicity of the CG resource is required according to a change of the requirements of the communication service, the periodicity change of the CG resource may be possible through a reconfiguration procedure of the configured-grant configuration information. That is, since the reconfiguration procedure of the configured-grant configuration information should be performed to change the periodicity of the CG resource, there is a problem in that the periodicity of the CG resource cannot be changed immediately.

In order to solve this problem, the periodicity of the CG resource may be changed through a medium access control (MAC) control element (CE) or a DCI.

MAC CE-Based CG Resource Periodicity Change Method

Figure 5:
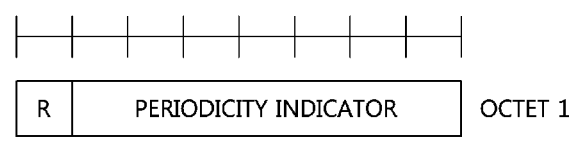
FIG. 5 is a block diagram illustrating a first exemplary embodiment of a MAC CE in a communication system.

The periodicity of the CG resource may be configured by a periodicity parameter included in the configured-grant configuration information transmitted through the RRC message. When a change in the periodicity of the CG resource is required according to the change of the requirements of the communication service, the base station may generate a MAC CE including the periodicity indicator. The MAC CE may be configured as shown in FIG. 5. FIG. 5 is a block diagram illustrating a first exemplary embodiment of a MAC CE in a communication system.

The periodicity indicator included in the MAC CE may indicate one of the values shown in Table 2. A logical channel identifier (LCD) for the MAC CE including the periodicity indicator may be configured as shown in Table 3.

TABLE 3

| Index | LCID value |
|---|---|
| 0 | CCH (common control channel) |
| 1-32 | logical channel Identifier |
| 33-45 | Reserved |
| 46 | Periodicity indicator |

The base station may transmit a message including the MAC CE to the terminal. The terminal may receive the message from the base station, and may obtain the periodicity indicator from the MAC CE included in the received message. A MAC entity of the terminal may identify the periodicity indicator included in the MAC CE, and may inform a PHY entity of the terminal of the periodicity of the CG resource according to the periodicity indicator. The terminal may transmit uplink data to the base station by using the CG resource according to the periodicity indicated by the periodicity indicator.

DCI-Based CG Resource Periodicity Change Method

The CG resource may be configured by the configured-grant configuration information transmitted through the RRC message. The CG resource configured by the RRC message may be activated or released by a DCI.

When activation of the CG resource configured by the RRC message is required, the base station may generate a DCI based on Table 4 below, and may transmit the generated DCI to the terminal through a PDCCH. When the 'hybrid automatic repeat request (HARD) process number' and 'redundancy version (RV)' included in the DCI are configured as shown in Table 4, the DCI may indicate that activation of the CG resource is required. The DCI (e.g., CRC value of the DCI) may be scrambled using a configured scheduling RNTI (CS-RNTI) configured by an RRC message.

TABLE 4

| | DCI format 0_0 or 0_1 | DCI format 1_0 | DCI format 1_1 |
|---|---|---|---|
| HARQ process number | All 0 | All 0 | All 0 |
| RV | 00 | 00 | 00 (RV for enabled TB) |

In addition, a new data indicator (NDI) included in the DCI (e.g., NDI set to '0') may indicate that the corresponding DCI is a DCI indicating activation or release of the CG resource.

The terminal may receive the DCI by monitoring the PDCCH. When the NDI included in the DCI is set to '0', the terminal may determine that the corresponding DCI is a DCI indicating activation or release of the CG resource configured by the RRC message. When the HARQ process number and the RV included in the DCI are configured as shown in Table 4, the terminal may determine that the CG resource configured by the RRC message is activated. Therefore, when uplink data is generated in the terminal, the terminal may transmit the uplink data to the base station using the CG resource configured by the RRC message.

Alternatively, if the release of the CG resource configured by the RRC message is required, the base station may generate a DCI based on Table 5 below, and may transmit the generated DCI to the terminal through a PDCCH. When the 'HARQ process number', 'RV', 'modulation and coding scheme (MCS)', and 'resource block assignment' included in the DCI are configured as shown in Table 5, the DCI may indicate that the release of the CG resource is required. The DCI (e.g., CRC value of the DCI) may be scrambled using the CS-RNTI configured by an RRC message.

TABLE 5

|  | DCI format 0_0 | DCI format 1_0 |
|---|---|---|
| HARQ process number | All 0 | All 0 |
| RV | 00 | 00 |
| MCS | All 1 | All 1 |
| Resource block assignment | All 1 | All 1 |

The terminal may receive the DCI by monitoring the PDCCH. When the NDI included in the DCI is set to '0', the terminal may determine that the corresponding DCI is a DCI indicating activation or release of the CG resource configured by the RRC message. When the 'HARQ process number', 'RV', 'MCS', and 'resource block assignment' included in DCI are configured as shown in Table 5, the terminal may determine that the CG resource configured by the RRC message is released. Therefore, the terminal may not use the CG resource configured by the RRC message for transmission of uplink data.

Meanwhile, the periodicity of the CG resource may be configured by a periodicity parameter included in the configured-grant configuration information transmitted through the RRC message. When a change in the periodicity of the CG resource is required according to the change of the requirements of the communication service, the base station may generate a DCI including a periodicity indicator.

When DCI format 0_0 is used, the DCI including periodicity indicator may be configured as shown in Table 6 below.

TABLE 6

|  | DCI format 0_0 |
|---|---|
| HARQ process number | All 0 |
| RV | 00 |
| MCS | All 0 |
| Resource block assignment | All 0 |
| Time domain resource assignment | Periodicity indicator |
| Frequency hopping flag |  |
| TPC command for scheduled PUSCH |  |

The 'HARQ process number', 'RV', 'MCS', and 'resource block assignment' included in the DCI may indicate that the DCI is a DCI including a periodicity indicator (e.g., DCI indicating a periodicity change of the CG resource). The 'time domain resource assignment', 'frequency hopping flag', and 'transmission power control (TPC) command for scheduled PUSCH' included in the DCI may indicate the periodicity indicator. The periodicity indicator may be configured to one of the values described in Table 2.

When DCI format 1_0 is used, the DCI including the periodicity indicator may be configured as shown in Table 7 below.

TABLE 7

|  | DCI format 1_0 |
|---|---|
| HARQ process number | All 0 |
| RV | 00 |
| MCS | All 0 |
| Resource block assignment | All 0 |
| Time domain resource assignment | Periodicity indicator |
| VRB-to-PRB mapping |  |
| Downlink assignment index |  |

The 'HARQ process number', 'RV', 'MCS', and 'resource block assignment' included in the DCI may indicate that the corresponding DCI is a DCI including the periodicity indicator (e.g., DCI indicating a periodicity change of the CG resource). The 'time domain resource assignment', 'virtual resource block to physical resource block (VRB-to-PRB) mapping', and 'downlink assignment index' included in the DCI may indicate the periodicity indicator. The periodicity indicator may be configured to one of the values described in Table 2.

The base station may transmit the DCI including the parameters described in Table 6 or Table 7 to the terminal through a PDCCH. The DCI (e.g., CRC value of the DCI) may be scrambled using CS-RNTI. The terminal may receive the DCI by monitoring the PDCCH. When the 'HARQ process number', 'RV', 'MCS', and 'resource block assignment' included in the DCI are configured as shown in Table 6 or 7, the terminal may determine that the DCI includes the periodicity indicator, and obtain the periodicity indicator from the corresponding DCI.

When the periodicity indicator is obtained and the terminal operates according to the periodicity indicated by the periodicity indicator, the terminal may generate a MAC CE including information indicating that the CG resource periodicity reconfigured by the DCI has been confirmed by the terminal (hereinafter, configured-grant confirmation information). The terminal may transmit a message including the MAC CE to the base station. Here, the message including the MAC CE may be transmitted through the CG resource.

The base station may receive the message including the MAC CE from the terminal, and may determine that the terminal operates according to the CG resource periodicity reconfigured by the DCI based on the configured-grant confirmation information included in the MAC CE.

Therefore, when uplink data is generated in the terminal, the terminal may transmit the uplink data to the base station by using the CG resource according to the periodicity reconfigured by the DCI. The base station may receive the uplink data from the terminal based on the information elements included in the DCI.

Methods for Avoiding Collisions between HARQ Process Identifiers

In a random access procedure, the HARQ process ID of MSG3 may be fixedly assigned to '0'. If the random access procedure (e.g., random access procedure for beam failure recovery (BFR)) is performed after the configured-grant is configured by the RRC message, the HARQ process ID of MSG3 in the random access procedure may collide with the HARQ process ID of the MAC protocol data unit (PDU) in the uplink communication.

For example, after an uplink signal (e.g., PUSCH) including a MAC PDU having a HARQ process ID #0 is transmitted, MSG3 having a HARQ process ID #0 may be transmitted in the random access procedure. When the uplink signal including the MAC PDU having the HARQ process ID #0 is retransmitted due to a transmission failure of the uplink signal, the HARQ process ID #0 of the uplink signal may collide with the HARQ process ID #0 of MSG3.

Alternatively, after the MSG3 having the HARQ process ID #0 is transmitted in the random access procedure, an uplink signal (e.g., PUSCH) including the MAC PDU having the HARQ process ID #0 may be transmitted. When the MSG3 having the HARQ process ID #0 is retransmitted due to a transmission failure of the MSG3, the HARQ process ID #0 of the uplink signal may collide with the HARQ process ID #0 of the MSG3.

To solve this problem, the base station may generate a random access response (RAR) message including an HARQ process ID for the MSG3. The RAR message may include a UL grant for the MSG3, and the base station may know the HARQ process ID for the PUSCH in the configured-grant based uplink communication at the time of generation of the UL grant for the MSG3. For example, the base station may identify the HARQ process ID for the PUSCH in the configured-grant based uplink communication based on Equation 1 below.

$$HARQ\ process\ ID = \left\lfloor \frac{Current\ symbol}{Periodidy} \right\rfloor modulo\ (number\ of\ HARQ\ processes) \quad \text{[Equation 1]}$$

The base station may determine the HARQ process ID excluding the HARQ process ID used for the PUSCH in the configured-grant based uplink communication among the HARQ process IDs as the HARQ process ID for the MSG3.

Figure 6:
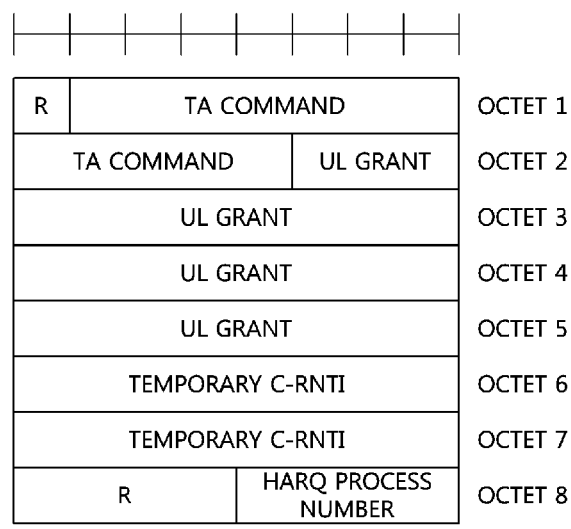
FIG. 6 is a block diagram illustrating a first exemplary embodiment of a RAR message in a communication system.

The base station may transmit a RAR message including a timing advanced (TA) command, a UL grant, a temporary C-RNTI, and a HARQ process ID for MSG3 to the terminal. The RAR message may be configured as shown in FIG. 6. FIG. 6 is a block diagram illustrating a first exemplary embodiment of a RAR message in a communication system. The terminal may receive the RAR message from the base station, identify the information elements included in the RAR message, and perform a random access procedure using the identified information elements. For example, the base station may transmit the MSG3 with the HARQ process ID indicated by the RAR message to the base station.

Methods for Multiplexing Grant PUSCH and Configured-Grant PUSCH

The 'grant PUSCH' may be a PUSCH transmitted based on an UL grant included in a DCI. For example, when uplink data (e.g., enhanced Mobile BroadBand data (eMBB)) is generated in the terminal, the terminal may transmit a scheduling request (SR) for the uplink data to the base station. When the SR is received from the terminal, the base station may configure a UL grant including resource allocation information for the uplink data, and may transmit a DCI including the UL grant to the terminal. The terminal may receive the DCI from the base station, and may transmit a PUSCH based on the UL grant included in the DCI.

The 'configured-grant PUSCH' may be a PUSCH transmitted based on configured-grant configuration information included in an RRC message. For example, the base station may transmit an RRC message including configured-grant configuration information. The terminal may receive the RRC message from the base station, and may identify the configured-grant configuration information included in the RRC message. When uplink data (e.g., URLLC data) is generated in the terminal, the terminal may transmit a PUSCH using the CG resource indicated by the configured-grant configuration information.

The grant PUSCH and configured-grant PUSCH may be transmitted as follows.

Figure 7:
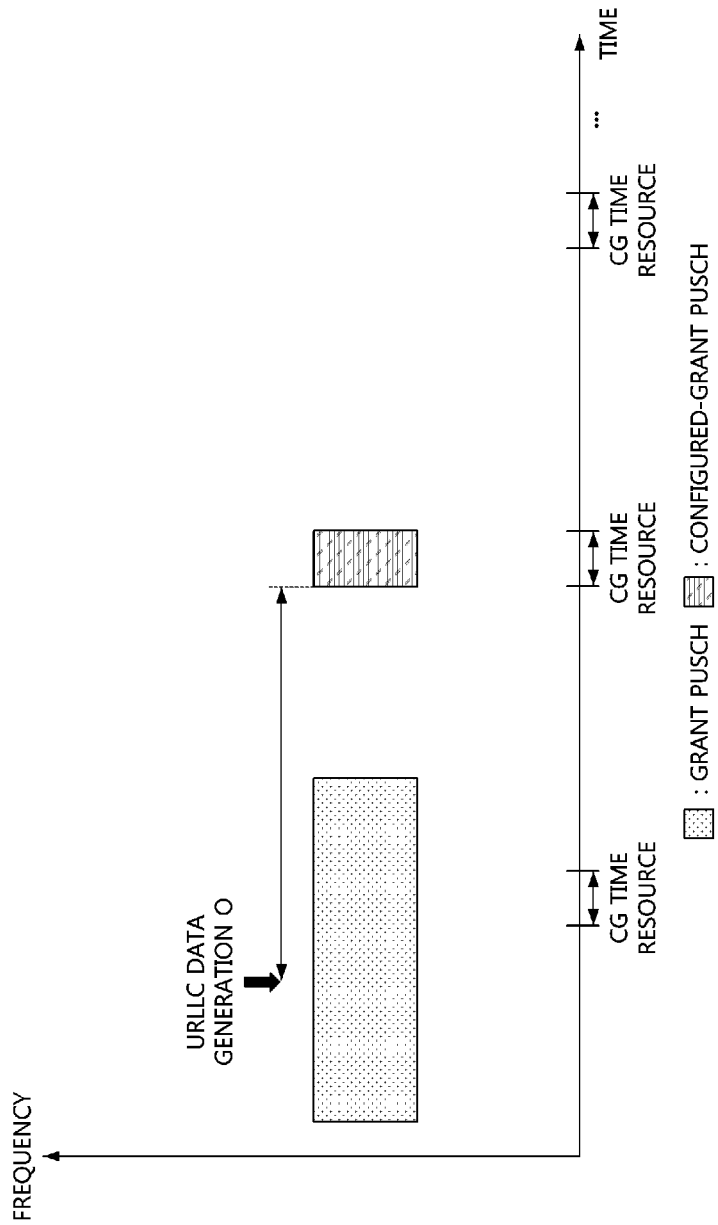
FIG. 7 is a conceptual diagram illustrating a first exemplary embodiment of a method for transmitting a grant PUSCH and a configured-grant PUSCH in a communication system.

FIG. 7 is a conceptual diagram illustrating a first exemplary embodiment of a method for transmitting a grant PUSCH and a configured-grant PUSCH in a communication system.

Referring to FIG. 7, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2.

When uplink data (e.g., eMBB data) is generated in the terminal, the terminal may transmit an SR for the uplink data to the base station, and may receive a DCI including a UL grant from the base station in response to the SR. The terminal may transmit a PUSCH (i.e., grant PUSCH) through a resource indicated by the UL grant included in the DCI.

Meanwhile, URLLC data may be generated in the terminal during transmission of the grant PUSCH. The URLLC data may be transmitted on a configured-grant PUSCH, and when the CG resource configured by the RRC message (i.e., resource for the configured-grant PUSCH) overlap with the resource configured by the DCI (i.e., resource for the grant PUSCH), the transmission of the URLLC data may be skipped. In this case, the URLLC data may be transmitted after transmission of the grant PUSCH is completed, and thus transmission of the URLLC data may be delayed. Here, the priority of the grant PUSCH may be higher than the priority of the configured-grant PUSCH.

To solve this problem, the configured-grant PUSCH may be multiplexed with the grant PUSCH.

Figure 8:
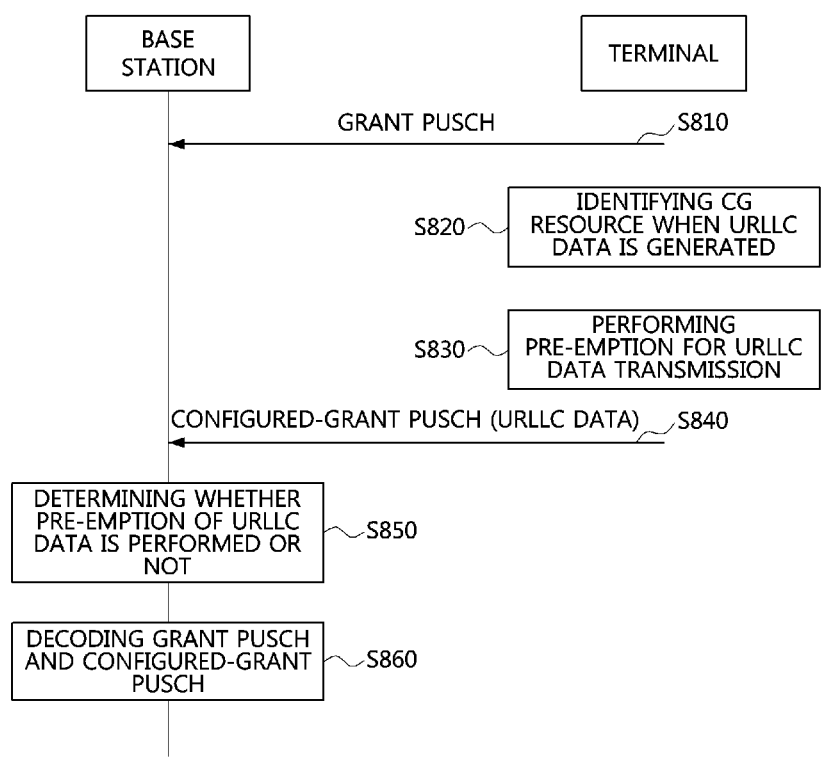
FIG. 8 is a sequence chart illustrating a first exemplary embodiment of an uplink communication method in a communication system.
Figure 9:
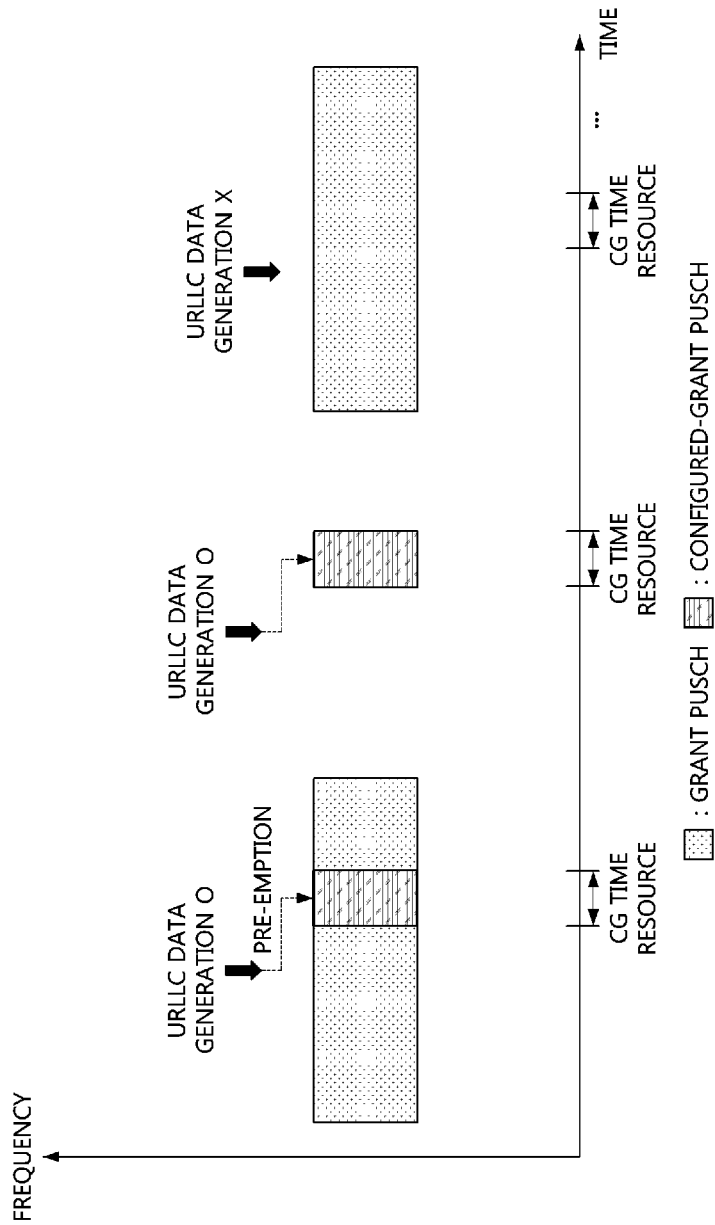
FIG. 9 is a conceptual diagram illustrating a grant PUSCH and a configured-grant PUSCH transmitted according to the uplink communication method shown in FIG. 8.

FIG. 8 is a sequence chart illustrating a first exemplary embodiment of an uplink communication method in a communication system, and FIG. 9 is a conceptual diagram illustrating a grant PUSCH and a configured-grant PUSCH transmitted according to the uplink communication method shown in FIG. 8.

Referring to FIGS. 8 and 9, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2.

The terminal may transmit a grant PUSCH based on a UL grant included in a DCI received from the base station (S810). When URLLC data is generated during transmission of the grant PUSCH, the terminal may identify the CG resource indicated by the configured-grant configuration information included in the RRC message (S820). If the CG resource overlaps with the resource indicated by the UL grant, the terminal may pre-empt a region in the grant PUSCH, which overlaps with the CG resource (S830). The terminal may transmit a configured-grant PUSCH (e.g., URLLC data) through the pre-empted region (S840). In this case, the grant PUSCH may be transmitted based on a rate matching scheme or a puncturing scheme.

On the other hand, the base station may receive the grant PUSCH through the resource indicated by the UL grant included in the DCI. The base station may determine whether preemption for the configured-grant PUSCH is performed or not by performing blind decoding (S850). If the configured-grant PUSCH is pre-empted in the resource indicated by the UL grant, the base station may decode the grant PUSCH and the configured-grant PUSCH based on a rate matching scheme or a puncturing scheme (S860).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal supporting uplink communication in a communication system, the operation method comprising:
    receiving a radio resource control (RRC) message from a base station, the RRC message including information indicating a frequency resource of a physical uplink shared channel (PUSCH);
    receiving downlink control information (DCI) used for scheduling a physical downlink shared channel (PDSCH) from the base station, the DCI including resource allocation information of the PDSCH and information indicating a time resource of the PUSCH;
    receiving the PDSCH using the resource allocation information included in the DCI from the base station; and
    transmitting the PUSCH to the base station using the time-frequency resource indicated by the RRC message and the DCI.

2. The operation method according to claim 1, wherein the RRC message includes a table indicating candidate time resources for the PUSCH, and the information indicating the time resource of the PUSCH included in the DCI indicates one of the candidate time resources.

3. The operation method according to claim 2, wherein the table includes an offset, a starting symbol, and a length of each of the candidate time resources.

4. The operation method according to claim 1, wherein the RRC message further includes information indicating a periodicity of the time resource, wherein the time resource used for transmission of the PUSCH is determined according to the periodicity indicated by the RRC message.

5. The operation method according to claim 1, wherein the DCI further includes information indicating a reconfigured periodicity, wherein the time resource used for transmission of the PUSCH is determined according to the reconfigured periodicity indicated by the DCI.

6. The operation method according to claim 1, wherein the DCI further includes an indicator requesting activation of the frequency resource configured by the RRC message.

7. An operation method of a base station supporting uplink communication in a communication system, the operation method comprising:
    transmitting a radio resource control (RRC) message to a terminal, the RRC message including information indicating a frequency resource of a physical uplink shared channel (PUSCH);
    transmitting downlink control information (DCI) used for scheduling a physical downlink shared channel (PDSCH) to the terminal, the DCI including resource allocation information of the PDSCH and information indicating a time resource of the PUSCH;
    transmitting the PDSCH using the resource allocation information included in the DCI to the terminal; and
    receiving the PUSCH from the terminal through the time-frequency resource indicated by the RRC message and the DCI.

8. The operation method according to claim 7, wherein the RRC message includes a table indicating candidate time resources for the PUSCH, and the information indicating the time resource of the PUSCH included in the DCI indicates one of the candidate time resources.

9. The operation method according to claim 8, wherein the table includes an offset, a starting symbol, and a length of each of the candidate time resources.

10. The operation method according to claim 7, wherein the RRC message further includes information indicating a periodicity of the time resource, wherein the time resource used for transmission of the PUSCH is determined according to the periodicity indicated by the RRC message.

11. The operation method according to claim 7, wherein the DCI further includes information indicating a reconfigured periodicity, wherein the time resource used for transmission of the PUSCH is determined according to the reconfigured periodicity indicated by the DCI.

12. The operation method according to claim 7, wherein the DCI further includes an indicator requesting activation of the frequency resource configured by the RRC message.

13. An operation method of a terminal supporting uplink communication in a communication system, the operation method comprising:
    receiving, from a base station, a radio resource control (RRC) message including a first grant for first data;
    receiving, from the base station, downlink control information (DCI) including a second grant for second data; and
    when a first time-frequency resource indicated by the first grant overlaps a second time-frequency resource indicated by the second grant, transmitting the first data to the base station by using the first time-frequency resource, and transmitting the second data to the base station by using a resource excluding the first time-frequency resource among the second time-frequency resource.

14. The operation method according to claim 13, further comprising transmitting a scheduling request (SR) for requesting resource allocation for the second data to the base station when the second data is generated, wherein the DCI including the second grant is received in response to the SR.

15. The operation method according to claim 13, wherein the first data is transmitted based on a rate matching scheme or a puncturing scheme.

16. The operation method according to claim 13, wherein a transmission priority of the first data is higher than a transmission priority of the second data.

17. The operation method according to claim 13, wherein the first time-frequency resource indicated by the first grant is configured according to a preconfigured periodicity.

* * * * *